United States Patent [19]

Baurle et al.

[11] Patent Number: 4,651,155

[45] Date of Patent: Mar. 17, 1987

[54] BEAMFORMING/NULL-STEERING ADAPTIVE ARRAY

[75] Inventors: Herbert F. Baurle, Huntington Station; Raymond J. Masak, E. Northport, both of N.Y.

[73] Assignee: Hazeltine Corporation, Commack, N.Y.

[21] Appl. No.: 383,036

[22] Filed: May 28, 1982

[51] Int. Cl.[4] .............................................. H04B 15/00

[52] U.S. Cl. .................................... 342/378; 375/102; 455/306

[58] Field of Search ........ 343/370, 374, 368, 379–384, 343/378; 455/278, 279, 296, 305, 306; 375/99, 102

[56] References Cited

U.S. PATENT DOCUMENTS

| | | | |
|---|---|---|---|
| 3,763,490 | 10/1973 | Hadley et al. | 343/379 X |
| 4,017,867 | 4/1977 | Claus | 343/368 |
| 4,032,922 | 6/1977 | Provencher | 343/374 X |
| 4,079,381 | 3/1978 | Piesinger | 343/368 |
| 4,225,870 | 9/1980 | Marner et al. | 343/370 |

*Primary Examiner*—Theodore M. Blum
*Assistant Examiner*—Gilberto Barrón, Jr.
*Attorney, Agent, or Firm*—E. A. Onders; F. R. Agovino

[57] ABSTRACT

A beamforming adaptive control loop is simultaneously employed in combination with a null-steering adaptive control loop to enhance the signal/interference ratio resulting in an increase in the message quality. The loops employ spectral processing in which case band-pass filters and notch filters form separate loops which enhance the desired signals and cancel the undesired signals, respectively. The correlated output from the beamforming loop is added to the correlated output of the null-steering loop and mixed with the incoming signal.

3 Claims, 4 Drawing Figures

NULL-STEERING ONLY

NULL-STEERING AND BEAMFORMING

BEAMFORMING/NULL-STEERING ADAPTIVE ARRAY

The Government has rights in this invention pursuant to Contract No. F30602-78-C-0067 awarded by the U.S. Air Force.

BACKGROUND OF THE INVENTION

1. Field of the Invention

The invention relates generally to an apparatus for adaptive signal processing and, in particular, an adaptive processor including beamforming and null-steering.

2. Description of the Prior Art

Phase-coded spread spectrum communication signals may be acquired and synchronized in the presence of interference with the aid of an adaptive array under the control of an LMS algorithm performing power minimization. However, the signal to interference (S/I) ratio at the adaptive array output port of a system using this type of processing, although adequate for acquisition and synchronization, provides undesirable message quality which, at best, is several decibels below the theoretical maximum obtainable when direction of arrival (beam steering) information is available.

In narrow band communication systems (e.g., AM radios), the spectral bandwidth of the interference source is significantly wider than the desired signal's bandwidth. Null-steering in such a case may be obtained by an LMS algorithm with spectral preconditioning of the control signals to prevent null formation on the desired signal.

SUMMARY OF THE INVENTION

It is an object of this invention to provide an adaptive processor which performs simultaneously beamforming and null-steering.

It is another object of this invention to provide an adaptive processor with the first adaptive control loop having notch filters and a second adaptive control loop having bandpass filters.

The invention includes an apparatus for cancelling interference affecting a desired signal. First means provides the desired signal and any undesired signal received with the desired signal and is associated with a null-steering adaptive loop for separating the desired signal and the undesired signal. The null-steering adaptive loop cancels at least a portion of the undesired signal. A beamforming adaptive loop is also associated with the first means for separating the desired signal and the undesired signal and enhancing at least a portion of the desired signal. Second means are provided for coordinating the null-steering adaptive loop and the beamforming adaptive loop. The null-steering and beamforming loops are spectral processors employing notch and bandpass filters, respectively.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
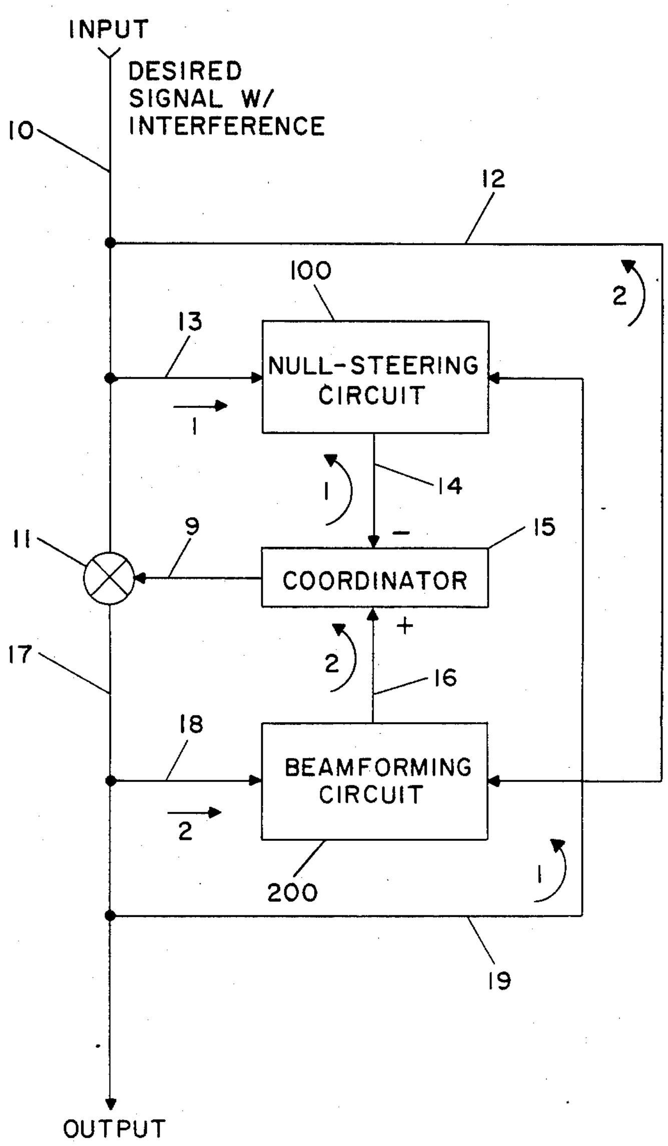
FIG. 1 is a block diagram of an adaptive processor according to the invention.
Figure 2:
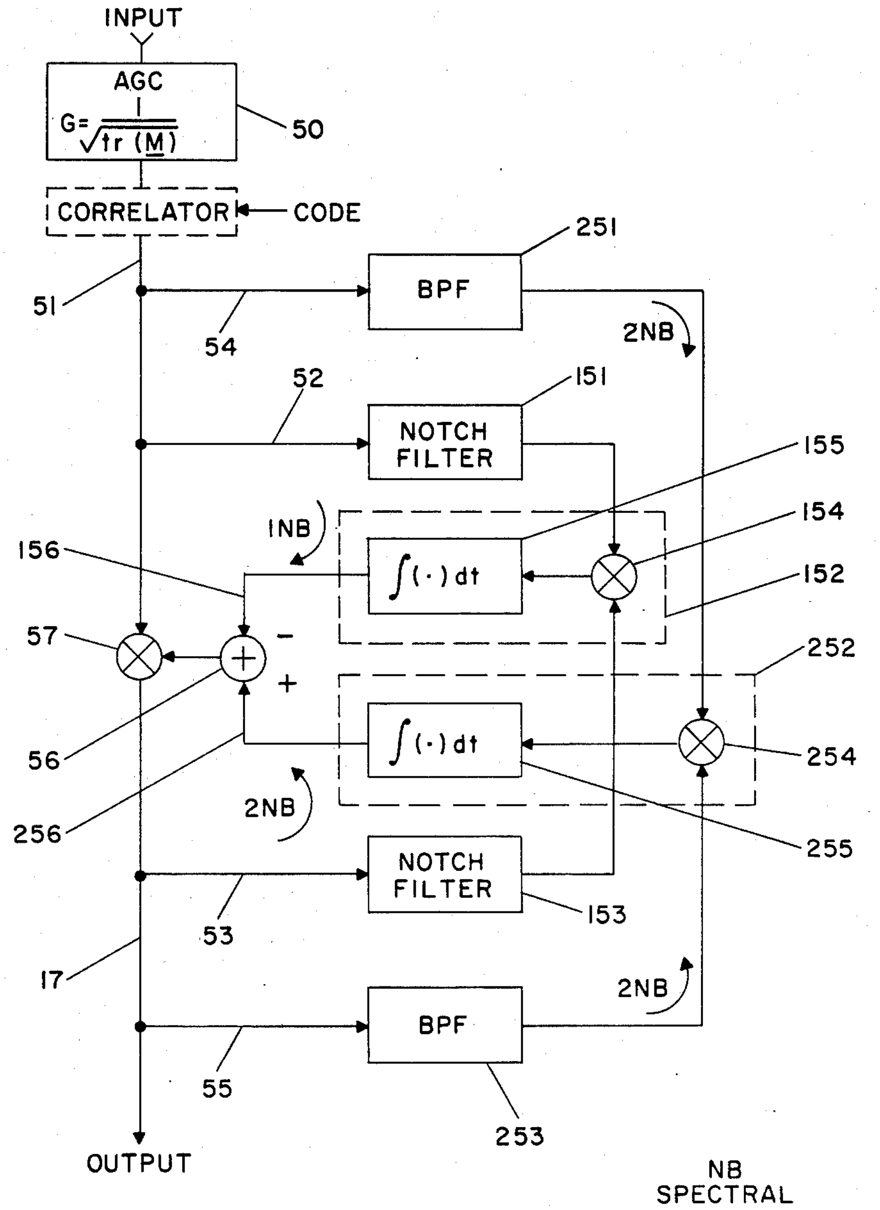
FIG. 2 is a block diagram of a narrow band spectral adaptive processor according to the invention.

FIGS. 1 and 2 are single line diagrams used generally to represent a vector system with multiple signals. As used herein, reference to a "line" are intended to generally mean multiple paths transmitting more than one signal. Similarly, references to "mixers" generally mean vectorial weights combining multiple signals.

FIG. 1 illustrates in block diagram form the general features of the invention. A desired signal with undesired signals (i.e., interference) is provided by line 10 to mixer 11. The desired signal with interference is also provided via line 12 to beamforming circuit 200 and via line 13 to null-steering circuit 100. The output of null-steering circuit 100 is provided via line 14 to coordinator 15 which adds it to the output of beamforming circuit 200 provided via line 16. The coordinated sum is provided via line 9 to mixer 11 so that mixed output line 17 carries the desired signal with interference mixed with the output of coordinator 15. This mixed signal is provided via line 18 to beamforming circuit 200 and via line 19 to null-steering circuit 100. Effectively, the null-steering circuit 100 functions as a first vector loop 1 to cancel at least a portion of the interfering signals. Conversely, the beamforming circuit 200 functions as a second vector loop 2 to enhance at least a portion of the desired signal so that the mixed signal provided by line 17 has an enhanced S/I ratio and, hence, message quality.

The null-steering circuit and beamforming circuit may accomplish their functions by temporal processing or by spectral processing. In narrow band communication systems, spectral processing as illustrated in FIG. 2 may be employed.

FIG. 2 is a block diagram of another embodiment of the invention with spectral conditioning of the control signals in the narrow band signal scenario. The embodiment of FIG. 3 consists of vector normalization (AGC) 50 and two separate adaptive loops in the form of weight control loops 1NB and 2NB. The desired signal with interference is provided to AGC 50, which provides a normalized signal for processing via line 51. In vector loop 1NB for null-steering, the reference signal and feedback signal are provided via line 52 and via line 53 to notch filters 151 and 153, respectively. The notch filters effectively remove the desired signals from the control signals of a modified LMS algorithm effected by correlator 152 with the minus sign in vector loop 1NB shown at adder 56 representing implementation of a minimization process.

In vector loop 2NB for beamforming, the reference signal and feedback signal are provided via line 54 and line 55 to bandpass filters 251 and 253, respectively. The bandpass filters process the provided signals to enhance the signal-to-interference power ratio of the control signals of a modified LMS algorithm effected by correlator 252, with a positive sign in loop 2NB shown at adder 56 representing implementation of a maximization process. Correlator 152 of loop 1NB comprises mixer 154 for mixing the outputs of notch filters 151 and 153, and integrator 155 for integrating the mixed outputs. Correlator 252 of loop 2NB includes mixer 254 for mixing the outputs of bandpass filters 251 and 253, and integrator 255 for integrating the mixed outputs. Output 156 of correlator 152 of loop 1NB is added to output 256 of correlator 252 of loop 2NB by adder 56 and the sum is mixed with the reference signal provided by line 51 to mixer 57, resulting in a mixed output signal provided by line 17. The second vector loop 2NB enhances the desired signal-to-interference power ratio of the control signals of a modified LMS algorithm effected by correlator 252, with a net positive signal shown at adder 56 representing implementation of a minimization process.

It has been found that use of the notch filter in accordance with the invention to reject the desired signals does not significantly affect loop stability. In computer simulations with notch filters executed with a CW signal as a desired signal and Gaussian noise as a jamming source, no adverse effect on loop stability was demonstrated. Such simulation also confirmed that the configuration according to the invention nulls the jammer signal and is transparent to the desired signal.

As shown in phantom in FIG. 2, the desired signal with interference may be code correlated after AGC 50. Specifically, the components of the signal vector may be code correlated so that the resultant signal vector provided to line 51 for processing contains the desired signal transformed into a narrow band form and interference which is still in wideband form. As a result, the narrow band spectral array processor with code correlation attains wideband array processing.

Figure 3:
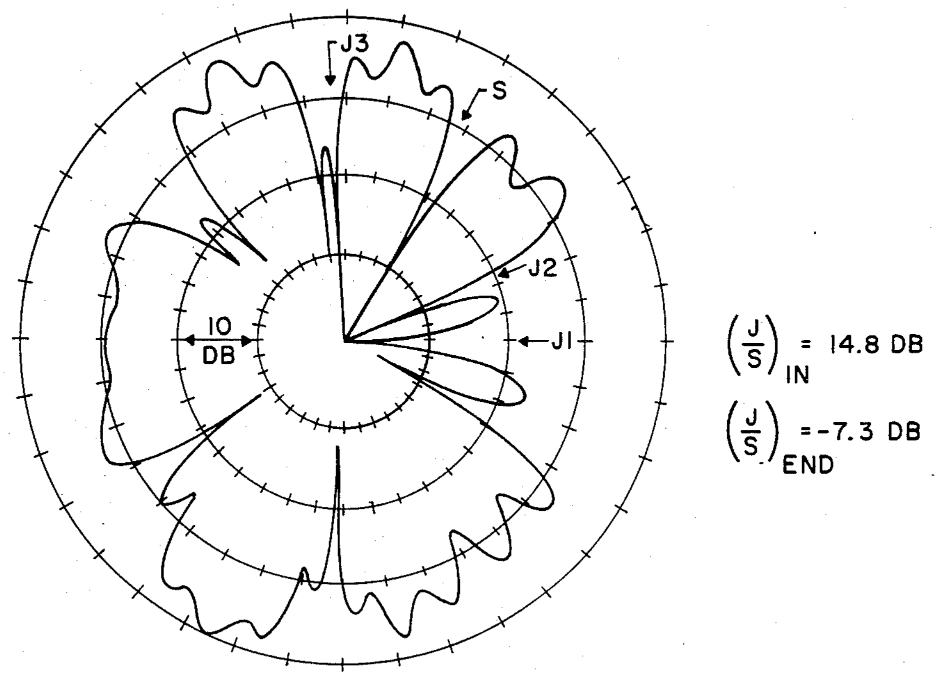
FIG. 3 is an array antenna pattern in the horizontal plane illustrating null-steering simulation.
Figure 4:
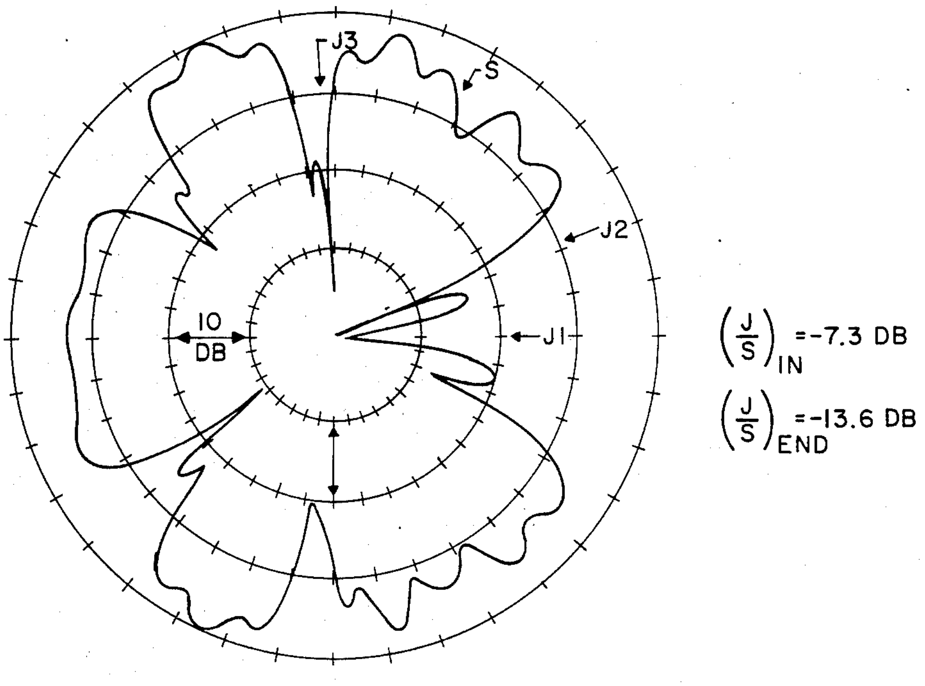
FIG. 4 is an array antenna pattern in the horizontal plane illustrating beamforming/null-steering simulation according to the invention.

FIGS. 3 and 4 illustrate the benefits of simultaneous null-steering and beamforming for a five-element random spaced array of antennas with an extent of $1\times6$ wavelengths in the azimuth plane and 2 wavelengths in elevation in a scenario consisting of three equal strength jammers (J1, J2, J3) which are 10 dB above the desired signal at each antenna:

| | Elevation | Azimuth |
|---|---|---|
| Jammer 1 (J1) | 0° | 0.4° |
| Jammer 2 (J2) | 0° | 22.3° |
| Jammer 3 (J3) | 0° | 93.8° |
| User (5) | 0° | 62.2° |

FIG. 3 is the adapted antenna pattern attained from a null-steering only control on the full signal band of frequencies (i.e., no notch filters) for a loop bias condition which results in a single element "on" quiescent weight vector. In the adapted state, all the jammers are nulled by about 30 dB and the desired signal(s) falls on the sides of a null which leads to a net improvement in S/J ratio of about 22 dB. FIG. 4 is the adapted pattern for the same scenario when the adaptive processor is configured according to the invention employing both null-steering and beamforming. In this adapted state, the null in the vicinity of the desired signal(s) is filled in leading to an additional 6 dB improvement in S/J ratio.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

We claim:

1. An apparatus for cancelling undesired signals received with a desired signal, said apparatus comprising:

(a) first means for providing the desired and any undesired signals received with the desired signal;

(b) a first adaptive control loop coupled to said first means, said first loop having a negative correcting output for minimizing the undesired signal;

(c) a second adaptive control loop coupled to the first means, said second loop having a positive correcting output for maximizing the desired signal;

(d) second means for summing the negative correcting output and the positive correcting output and providing a sum signal corresponding thereto;

(e) a mixer for mixing the desired and any undesired signals with the sum signal to provide a mixed output;

(f) said first adaptive control loop further comprising a first notch filter circuit coupled to the first means and providing a notch unmixed output, a second notched circuit coupled to the mixed output and providing a notch mixed output and a notch correlator correlating the notch unmixed output with the notch mixed output, said notch correlator providing the negative correcting output;

(g) said second adaptive control loop further comprising a first bandpass filter circuit coupled to the first means and providing a bandpass unmixed output, a second bandpass filter circuit coupled to the mixed output and providing a bandpass mixed output and a bandpass correlator correlating the bandpass unmixed output with the bandpass mixed output, said bandpass correlator providing the positive correcting output.

2. The apparatus of claim 1 wherein said bandpass correlator comprises:

(1) a first mixer for mixing the bandpass unmixed output and the bandpass mixed output and providing a first mixer output; and (2) a first integrator for integrating the first mixer output and providing the integrated first mixer output to the second means as the positive correcting output;

and wherein said notch correlator comprises:

(1) a second mixer for mixing the notch unmixed output and the notch mixed output providing a second mixer output; and (2) a second integrator for integrating the second mixer output and providing the integrated second mixer output to the second means as the negative connecting output.

3. The apparatus of claim 1 further including means for code correlating the vector components of the desired signal so that the resultant coded signal vector provided by said first means includes the desired signal transformed into a narrow band form and the undesired signal maintained in a wideband form.

* * * * *